United States Patent
Housse

(10) Patent No.: US 6,685,097 B1
(45) Date of Patent: Feb. 3, 2004

(54) SMART CARD COMPRISING A REMOVABLE MINICARD AND METHOD FOR MAKING SAME

(75) Inventor: Nicolas Housse, Saint Zacharie (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/787,815

(22) PCT Filed: Aug. 31, 1999

(86) PCT No.: PCT/FR99/02071

§ 371 (c)(1), (2), (4) Date: Mar. 23, 2001

(87) PCT Pub. No.: WO00/17814

PCT Pub. Date: Mar. 30, 2000

(30) Foreign Application Priority Data

Sep. 24, 1998 (FR) .............................. 98 11971

(51) Int. Cl.$^7$ ............................. G06K 19/06
(52) U.S. Cl. ...................... 235/492; 235/487
(58) Field of Search ................... 235/487, 492

(56) References Cited

U.S. PATENT DOCUMENTS 4,639,585 A * 1/1987 Haghiri-Tehrani et al. .. 235/492
4,764,803 A    8/1988 Ueda
5,362,955 A   11/1994 Haghiri-Tehrani
5,581,065 A * 12/1996 Nishikawa et al. ......... 235/492
5,936,227 A *  8/1999 Truggelmann et al. ..... 235/492
6,448,638 B1 *  9/2002 Fidalgo et al. .............. 257/679
6,561,432 B1 *  5/2003 Vedder et al. .............. 235/492

FOREIGN PATENT DOCUMENTS

DE    19606789 A1   8/1997
EP     0521778      1/1993

* cited by examiner

Primary Examiner—Diane I. Lee
Assistant Examiner—Jamara A. Franklin
(74) Attorney, Agent, or Firm—Burns, Doane, Swecker & Mathis, L.L.P.

(57) ABSTRACT

The invention concerns a large format smart card having a card body and a minicard connected thereto by at least a strap. The strap includes a first portion arranged on the minicard side and shaped to form an imposed rupture zone for detaching the minicard by pressing with the finger. The strap also has a second portion, arranged on the card body side and capable of forming a hinge.

10 Claims, 3 Drawing Sheets

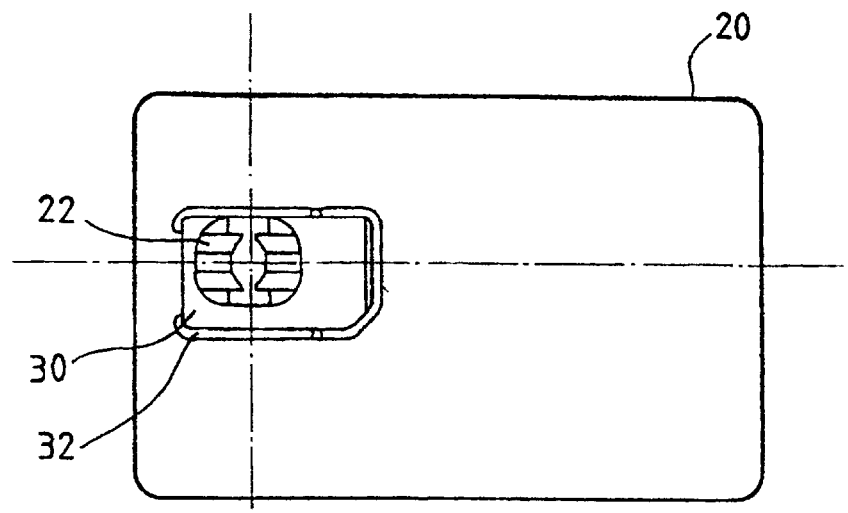
FIG_1
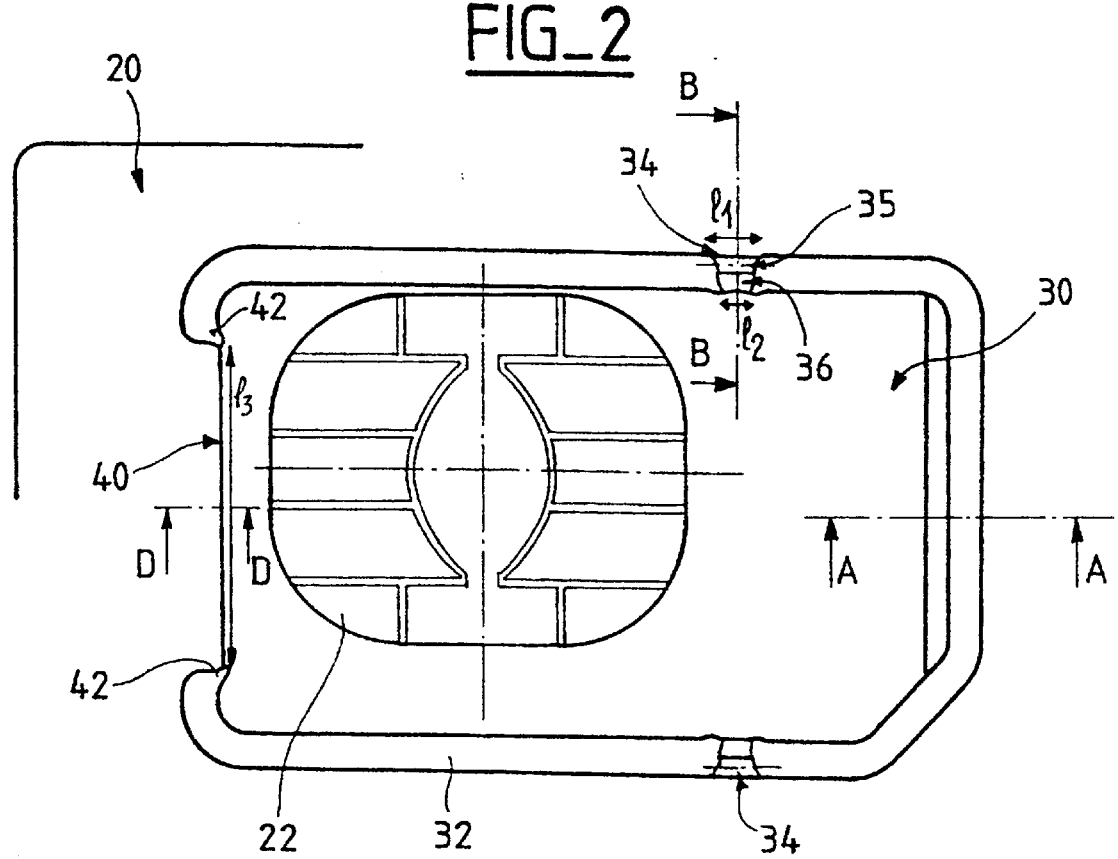
FIG_2

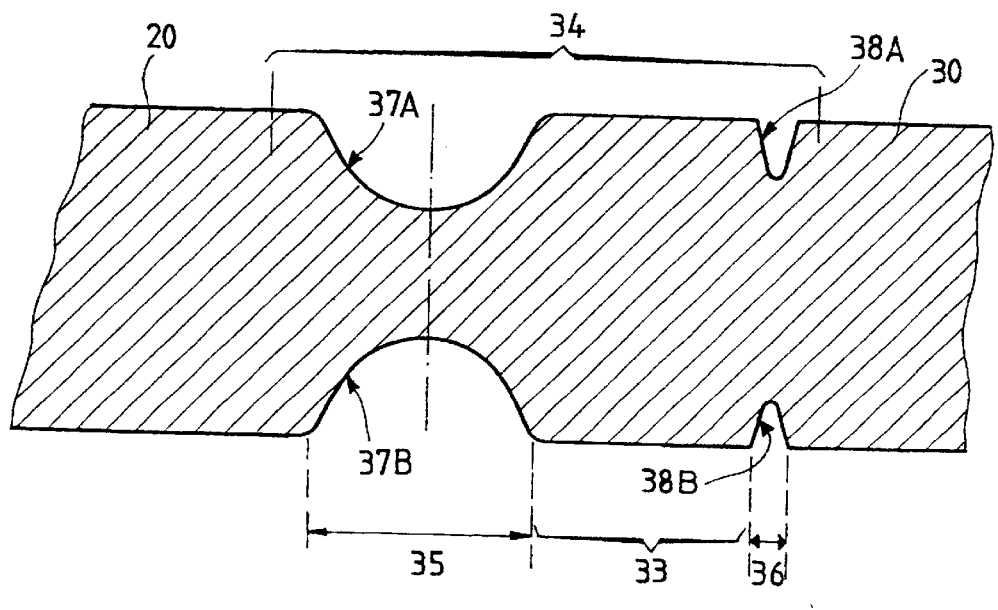
FIG_3
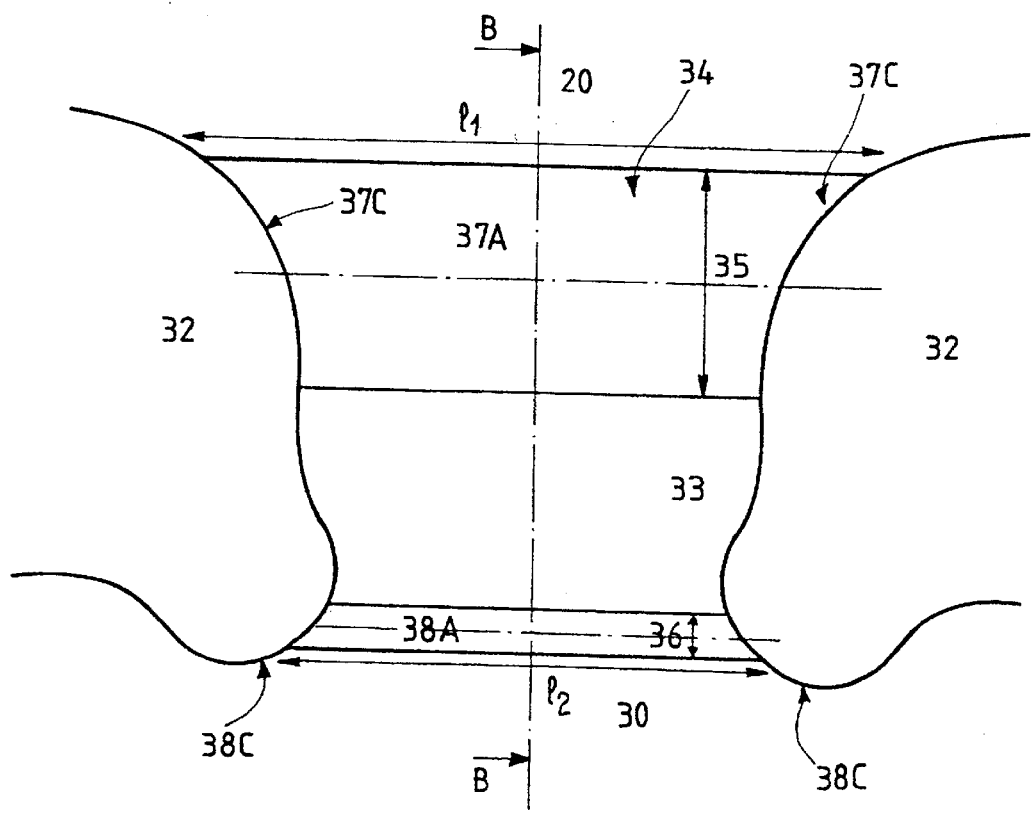
FIG 4.

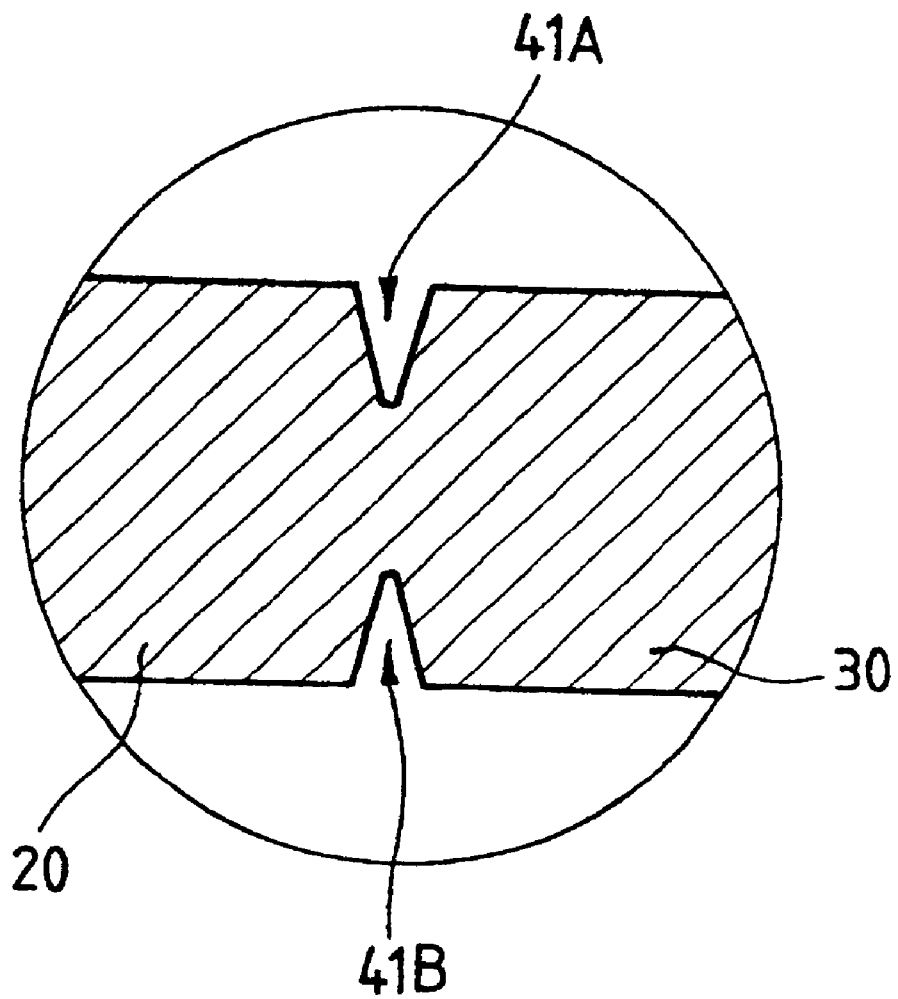

SMART CARD COMPRISING A REMOVABLE MINICARD AND METHOD FOR MAKING SAME

This disclosure is based upon, and claims priority from French Patent Application No. 98/11971, filed Sep. 24, 1998, and International Application No. PCT/FR99/02071, filed Aug. 31, 1999, the contents of which are incorporated herein by reference.

BACKGROUND OF THE INVENTION

The invention relates to cards that have electronics microcircuits and that are more generally known as "smart cards" or "chip cards".

One of the problems that is frequently encountered for mass consumer products is the problem of standardization, so that products coming from different manufacturers can be used in the same equipment.

This applies particularly to smart cards: they are used, for example, in public telephones, in card readers associated with personal computers, and in banking applications, etc. It has thus been necessary to adopt precise construction standards that all of the manufacturers must comply with. The general public is now very well acquainted with the format that has been adopted, at least as regards the outside dimensions of the card: it is the format of conventional credit cards with magnetic stripes. The smart card is a rectangle that is about 8.5 cm long by 5.4 cm wide, and that is a little less than one millimeter thick (international Standards ISO 7810 and 7816 today).

As a result, naturally, the machines for manufacturing smart cards are built as a function of those standards, so as to be capable of producing cards that comply with the standards.

But in certain applications, it has become apparent that that format is not ideal. This applies in particular for miniaturized applications. For example, when a smart card is to be used in a handheld housing of very small size, the current format, despite its small size, is not necessarily acceptable. By way of example, mention might be made of the mobile radiotelephone or "cellphone" whose handheld housing needs to use smart cards of format much smaller than the current format and complying with the GSM 11-11 Standard.

An object of the invention is to provide an inexpensive technical solution for making smart cards of format smaller than the generally-used format.

Methods have already been proposed in the prior art for making smart cards of small format. A method, described in particular in Patent EP-0 521 778, consists in performing all of the steps of manufacturing a smart card of standard format, and in performing an additional step of partially pre-cutting the standard-format card so that a small-format card can be detached from it merely by pressing with the fingers. The partial pre-cutting is performed around a micromodule contained in the card. The pre-cut is constituted by a slot extending around the outline of the small-format card, the slot being interrupted locally to leave webs between the small-format card and the standard-format card. In particular, those webs are of reduced thickness in the vicinity of the small-format card so as to enable it to be separated from the remainder of the body of the standard-format card merely by pushing it out with the fingers.

A major drawback of that type of method lies in the fact that the small-format card can, under certain rare conditions, not be detached very cleanly. The shear forces can be insufficiently concentrated on the location at which the detaching should take place, so that the small-format card can have uneven edges. In addition, during bending testing over the width of the standard-format card, the webs can be twisted and can be subjected to stresses. Exceptionally, such stresses can damage the micromodule contained in the card or can break one of the webs or "straps" unintentionally. In which case, the large-format card might not comply with Standard ISO 7816 as regards its bending and twisting strength.

SUMMARY OF THE INVENTION

The invention makes it possible to solve the above-mentioned problems by proposing an improved card. To this end, it provides a large-format smart card comprising a card body and a mini-card which is connected thereto by at least one strap, said strap including at least one portion disposed in the vicinity of the mini-card and shaped to constitute a place at which breaking is forced to occur or a "score line" in order to enable the mini-card to be separated by pushing it out with a finger, said smart card being characterized in that said strap also includes a second portion disposed in the vicinity of the card body and suitable for forming a hinge.

According to another characteristic of the invention, the hinge is constituted by a thinned neck formed by thinning the thickness of the strap.

According to yet another characteristic of the invention, the thinned neck is in the form of a trough having a rounded profile.

According to yet another characteristic of the invention, the score line is formed by two scores respectively on the front and on the back of the card.

According to yet another characteristic of the invention, the strap(s) is/are provided with connection fillets for connecting respectively to the card and to the mini-card.

According to another characteristic of the invention, the length of the strap on the side closer to the mini-card is shorter than the length of the strap on the side closer to the card body.

According to yet another characteristic, the smart card further comprises a long strap along a short side of the mini-card, which long strap includes a score line formed by two scores that extend over its entire length and on respective ones of both the front and the back of the card.

By subdividing the strap into two separate portions respectively comprising a thinned neck and a score line, the mechanical stresses are also separated. By means of the invention, the mini-card is easier to detach, and can be detached cleanly both on the front and on the back of the card. In addition, the mini-card offers good resistance to deformation due to bending testing of the card.

Another object of the invention is to provide a method of making a small-format smart card, comprising the entire method of manufacturing a standard-format smart card, and an additional step of forming a partial cut-out to the dimensions of the mini-card, said partial cut-out being constituted by a slot interrupted locally by at least one strap between the small-format card and the standard-format card, characterized in that the strap(s) is/are made so that it/each of them includes a first portion disposed in the vicinity of the mini-card and shaped to constitute a score line, and a second portion disposed in the vicinity of the standard-format card and constituted by a thinned neck formed by thinning the thickness of the strap, said first and second portions being implemented over the entire length of the strap and over both the front and the back of the card.

The partial cut-out makes it possible in particular to detach a card of predetermined small size from the card of standardized size.

The small card is detached only after the end of all of the manufacturing, testing, and customization printing operations, so that any standard manufacturing and testing equipment can be used without having to satisfy any constraint due to the small size desired for the final card.

Therefore, the manufacturing cost is low because it is not necessary to invest in costly additional manufacturing equipment merely to overcome the size problems.

BRIEF DESCRIPTION OF THE DRAWINGS

Other features and advantages of the invention will appear on reading the following description given by way of non-limiting example and with reference to the accompanying figures, in which:

FIG. 1 shows the principle of the invention for making a small-format card;

FIG. 2 is a view on a larger scale showing an example of a pre-cut using an interrupted slot allowing straps of material to remain;

FIG. 3 is a view in section on B—B of FIG. 2 through the thickness of a strap;

FIG. 4 is a plan view on a larger scale of the strap of FIG. 3; and

FIG. 5 is a view in section on D—D of FIG. 2 through the thickness of a long strap which is situated along a short edge of the small-format card.

DETAILED DESCRIPTION

FIG. 1 shows how the invention is implemented. On the basis of a flat rectangular card 20 of standard format, of length 8.5 cm, of width 5.4 cm, and of thickness less than one millimeter, the entire manufacturing process is performed, including testing the micromodule 22 (once said micromodule has been put in place in the top left corner of the card, with flush contacts), and testing the customization of the surfaces of the card with printed graphics.

But the final card may be much smaller, and its outline is shown FIG. 2. Said outline is defined by a cut 32 and by places at which breaking is forced to occur or "score lines" disposed around the micromodule 22. The card is to be detached along said outline.

A variety of methods may be used, and the card may be detached at various stages of its manufacture. For example, it may be detached, i.e. cut out, in one go at the end of manufacture.

In the invention, it is preferred to cut the card out partially rather than fully, and to do so at an intermediate stage. It is only at the stage of sending the card to the user, or even once the user is in possession of the card and is about to insert it into a reader built to the small-format standard, that the small-format card 30 is detached from the standard-format card 20 merely by pressing on the small-format card, e.g. with a finger.

When the user needs to use a large-format card, the mini-card 30 is not detached.

FIG. 2 shows a partial cut-out consisting of a slot 32 extending through the entire thickness of the card. This slot 32 defines and extends around the outline of the mini-card 30 except at certain locations where it is interrupted and allows straps 34 and 40 to remain that connect the small-format card 30 to the remainder of the standard-format card 20.

FIG. 3 shows a view in section on B—B through a strap 34 shown in FIG. 2. Said strap 34 is made up of two portions 35 and 36 in which it has a reduced thickness.

A first portion 36 situated closer to the small-format card 30 is shaped to constitute a score line. This score line is constituted in the example by scores 38A, 38B of conical shape formed respectively on the front face and on the back face of the card, and over the entire length $l_2$ of the strap 34, as shown in FIGS. 2 and 4. These scores are, for example, formed to a depth of 150 $\mu$m on the front of the card (reference 38A), and to a depth of 120 $\mu$m on the back of the card (reference 38B).

By forming the scores on both sides of the card, it is possible to facilitate pushing-out by hand (merely by pressing with the fingers), and to perform such pushing-out cleanly both on the back of the card and on the front of the card. Thus, once it has been detached, the mini-card 30 has clean-cut and even edges. These scores constitute a preferred example of a score line. Other variants may be suitable, such as weakening, removal of material, perforation, etc.

In a second portion 35, situated closer to the standard-format card 20, the thickness is thinned on both sides, front 37A and back 37B. This thinning is, in particular, performed by driving a suitable tool into the portion 35 to a sufficient depth, e.g. 250 $\mu$m on each face of the card. The resulting thinned neck further extends over the entire length $l_1$ of the strap as shown in FIG. 2 and on the enlarged plan view of FIG. 4.

In addition, this thinned neck 37A, 37B in the portion 35 of the strap 34 is preferably in the form of a trough having a rounded profile. This rounded shape prevents cracks from being created and from propagating during bending testing of the card. Corners that are too sharp, such as in a trapezoidal shape for example, are unsuitable because they do not prevent such cracks from propagating.

The thinned neck 37A, 37B of the strap 34 constitutes a hinge. A function of such a hinge is to provide mechanical decoupling between the card body and the first portion 36 that is shaped to constitute a place at which breaking is forced to occur or a "score line". In this way, it is possible to avoid accidental breakage of the straps 34 and unintentional separation of the mini-card 30.

A further function of the hinge is to act, while pressure is being applied intentionally, e.g. with a finger, on the mini-card 30, to displace and to concentrate the pressure stresses towards the score line (in the first portion 36), thereby guaranteeing that breakage occurs at this location rather than at some other location on the strap.

The hinge may be obtained directly by injection molding when the card and the slot making it possible to define the outline of the small-format card are obtained by injection molding. In which case, the shape of the hinge may be equivalent to a rounded thinned neck as in FIG. 3, or, for example, may constitute a flexible blade acting as a pivot.

In a variant, it is possible to make the hinge of a material that is more flexible than the remainder of the card, using a known two-component injection molding technique. A distinct flexible material that is adhesion compatible with the material of the card is injected into the mold at the strap.

The hinge may also be discontinuous and in two portions fitting into each other, the mini-card and the card body being manufactured independently, each with a respective hinge portion designed to interfit with the complementary portion.

While the thinning 37A, 37B of the second portion 35 and of the score line 38A, 38B in the first portion 36 is being performed, material is driven out to the sides as a result of the tool used penetrating into the thickness of the card. The driving-out of the material is controlled to be as plane as possible in order to avoid too many rejects when customizing the cards by heat transfer.

The slot 32 then has two connection fillets 37C, 38C which appear at either end of the strap 34 as shown in FIG. 2 and in the enlarged plan view of FIG. 4. Thus, in the planes of the surfaces of the card situated respectively above and below the portion 35 dedicated to the thinned neck, the slot 32 has a first connection fillet 37C for connecting to the standard format card 20; and in the planes of the surfaces of the card situated respectively above and below the portion 36 dedicated to the score line, the slot 32 has a second connection fillet 38C for connecting to the mini-card 30. The radius of curvature of the connection fillet 38C for connection to the mini-card is smaller than the radius of curvature of the connection fillet 37C for connecting to the card body 20. In addition, the strap 34 has a length $l_2$ in the vicinity of the small-format card 30 that is shorter than the length $l_1$ in the vicinity of the standard-format card 20.

The forces with which pressure is applied to the mini-card are displaced by the hinge (second portion 35) towards the zone 33 situated between the two portions 35, 36 of the strap 34, and they are concentrated onto the score line (first portion 36), so that it is possible to guarantee that the mini-card is snapped off cleanly. The mini-card 30 obtained in this way thus has clean-cut and even edges.

The smart card of the invention may also include other types of straps. For example, it may have a long strap 40 that extends along a short side of the mini-card 30, as shown in the diagram of FIG. 2. FIG. 5 shows a section view of this long strap referenced 40, whose length $l_3$ is longer than the lengths of the above-described straps. This strap 40 is provided with only one score line formed by two scores 41A, 41B which extend over its entire length. These two scores 41A, 41B are formed one respective ones of both the front and the back of the card.

The slot 32 is provided with two small fillets 42 at the two ends of the strap 40. These set-back fillets make it possible to ensure that the stresses are properly steered towards the scores 41, 41B while the mini-card 30 is being detached, e.g. by being pushed out with a finger.

What is claimed is:

1. A smart card comprising a card body and a mini-card which is connected thereto by at least one strap, said strap including at least one first portion disposed in a vicinity of the mini-card and shaped to constitute a place at which breaking is forced to occur in order to enable the mini-card to be separated by pushing said mini-card out with a finger, said strap further including a second portion, separate from said first portion, disposed in a vicinity of the card body and forming a hinge.

2. A smart card according to claim 1, wherein the hinge is constituted by a thinned neck formed by thinning the strap.

3. A smart card according to claim 2, wherein the thinned neck is in the form of a trough having a rounded profile.

4. A smart card according to claim 3, wherein the thinned neck is formed to a depth of 250 µm on both front and back of the card body.

5. A smart card according to claim 1, wherein said first portion comprises a score line formed by two scores respectively on front and on back of the card body.

6. A smart card according to claim 5, wherein the scores are formed respectively to a depth of 150 µm on the front of the card body and to a depth of 120 µm on the back of the card body.

7. A smart card according to claim 1, wherein said strap is provided with connection fillets for connecting respectively to the card body and to the mini-card. card.

8. A smart card according to claim 1, wherein a length of the strap one a side closer to the mini-card is shorter than a length of the strap on a side closer to the card body.

9. A smart card according to claim 1, further including a long strap along a short side of the mini-card, said long strap including a score line formed by two scores that extend over an entire length of said long strap and on respective ones of both front and back of the card body.

10. A method of making a mini-card, the method including the step of forming a partial cut-out to dimensions of the mini-card, said partial cut-out being constituted by a slot interrupted locally by at least one strap between the mini-card a standard-format card, said strap being formed such that said strap includes a first portion disposed in a vicinity of the mini-card and shaped to constitute a score line, and a second portion, separate from said first portion, disposed in a vicinity of the standard-format card and constituted by a thinned neck formed by thinning the strap, said first and second portions being implemented over an entire length of the strap and over both front and back of the standard-format card.

* * * * *